(12) United States Patent
Afshar Bakooshli

(10) Patent No.: US 12,152,440 B1
(45) Date of Patent: *Nov. 26, 2024

(54) ARTIFICIAL NEURAL NETWORK BASED CONTROLLING OF WINDOW SHADING SYSTEM AND METHOD

(71) Applicant: Azadeh Afshar Bakooshli, Las Vegas, NV (US)

(72) Inventor: Azadeh Afshar Bakooshli, Las Vegas, NV (US)

(73) Assignee: AI Incorporated, Toronto (CA)

( * ) Notice: Subject to any disclaimer, the term of this patent is extended or adjusted under 35 U.S.C. 154(b) by 26 days.

This patent is subject to a terminal disclaimer.

(21) Appl. No.: 18/086,544

(22) Filed: Dec. 21, 2022

Related U.S. Application Data

(63) Continuation of application No. 16/356,342, filed on Mar. 18, 2019, now Pat. No. 11,560,754.

(60) Provisional application No. 62/646,786, filed on Mar. 22, 2018.

(51) Int. Cl.
| | |
|---|---|
| *E06B 9/74* | (2006.01) |
| *E06B 9/68* | (2006.01) |
| *G05B 15/02* | (2006.01) |
| *G06N 3/084* | (2023.01) |
| *G06N 20/00* | (2019.01) |

(52) U.S. Cl.
CPC ............... *E06B 9/74* (2013.01); *G05B 15/02* (2013.01); *E06B 2009/6827* (2013.01); *G06N 3/084* (2013.01); *G06N 20/00* (2019.01)

(58) Field of Classification Search
CPC ............ E06B 9/74; G05B 15/02; G06N 20/00
USPC .......................................................... 700/47
See application file for complete search history.

(56) References Cited

U.S. PATENT DOCUMENTS

| | | | | |
|---|---|---|---|---|
| 2009/0308543 | A1* | 12/2009 | Kates ........................ | E06B 9/72 |
| | | | | 160/310 |
| 2015/0225999 | A1* | 8/2015 | Berman .............. | H04L 12/2827 |
| | | | | 700/275 |
| 2016/0258209 | A1* | 9/2016 | Berman .................... | E06B 9/68 |
| 2018/0073775 | A1* | 3/2018 | Cascia .................... | F24S 50/40 |
| 2018/0181085 | A1* | 6/2018 | Gabriel ..................... | E06B 9/68 |
| 2018/0329375 | A1* | 11/2018 | Gharabegian .......... | G05B 15/02 |

* cited by examiner

Primary Examiner — Md Abul Azad

(57) ABSTRACT

Included is a method for adjusting window shade settings of a window shade. At least one sensor captured environmental data of surroundings. A processor actuates at least one window shading setting to be applied to the window shade based on at least one of the environmental data, window shade setting preferences of a user, and at least one input received by an application of a communication device paired with the processor.

20 Claims, 2 Drawing Sheets

ARTIFICIAL NEURAL NETWORK BASED CONTROLLING OF WINDOW SHADING SYSTEM AND METHOD

CROSS-REFERENCE TO RELATED APPLICATIONS

This application is a Continuation of U.S. Non-Provisional patent application Ser. No. 16/356,342, filed Mar. 18, 2019, which claims the benefit of Provisional Patent Application No. 62/646,786, filed Mar. 23, 2018, each of which is hereby incorporated by reference.

FIELD OF THE DISCLOSURE

The disclosure relates to window shades and more particularly to a window shading system.

BACKGROUND

Window shades are important as they help control temperature and brightness within an area by adjusting the amount of sunlight coming through a window. Further window shades provide privacy by limiting visibility through a window. Traditionally window shades are physical objects that are used to cover windows and are manually adjusted to control the amount of visibility and sunlight coming through the window. With advances in technology, nanotechnology has been used as an alternative method for window shading. For example, electrified gel can be used to change the tint of a window and control the amount of visibility and sunlight coming through the window. However, adjusting the amount of visibility and sunlight coming through a window remains a manual task.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Included is a method for adjusting window shade settings of a window shade, including: capturing, with at least one sensor, environmental data of surroundings; and actuating, with a processor, at least one window shading setting to be applied to the window shade based on at least one of the environmental data, window shade setting preferences of a user, and at least one input received by an application of a communication device paired with the processor.

Provided is a tangible, non-transitory, machine readable medium storing instructions that when executed by a processor effectuates operations comprising those of the above-described method.

Provided is a window shading system implementing the above-described method.

DETAILED DESCRIPTION OF SOME EMBODIMENTS

Figure 1:
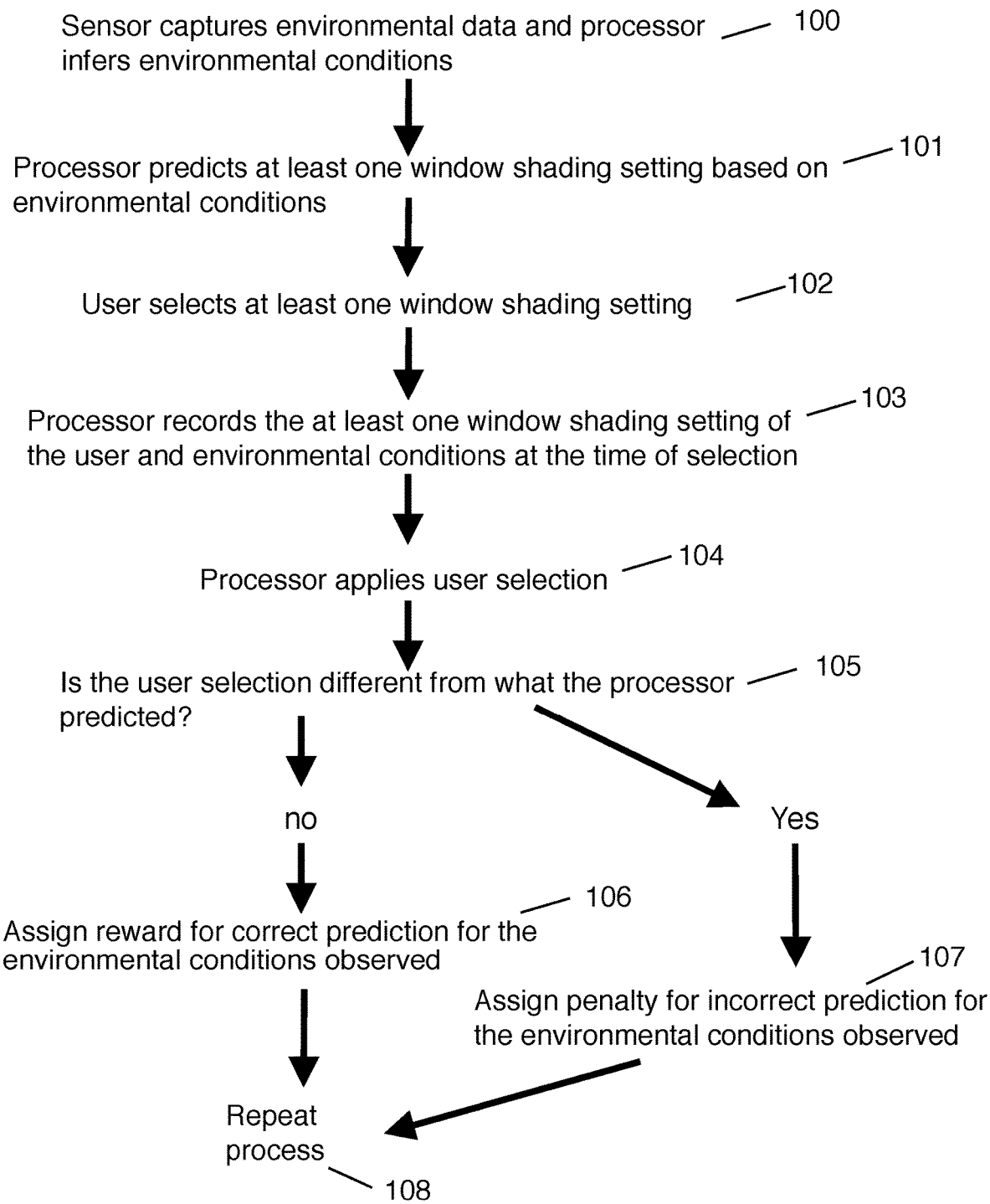
FIG. 1 illustrates a flowchart describing a method for controlling window shading settings, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments provide a window shading system that learns window shading preferences of a user based on historical window shading settings chosen by the user and environmental conditions. In embodiments, the window shading system includes a means for shading one or more windows, one or more sensors, and a processor. In some embodiments, the window shading system further includes a controller for manually adjusting the one or more window shades. In some embodiments, the means for shading one or more windows includes, for example, nanoparticle window tinting films (e.g., electrified gel) or a window shade (or blind) with a plurality of adjustable blind slats. In some embodiments, the controller adjusts the length of the one or more window shades and the angle of the plurality of blind slats. The window shading system may be used with various types of window shades, such as traditional window shades or nanotechnology window shading (or tinting) systems. The window shading system may be used with various types of windows, such as windows for low-rise and high-rise buildings, vehicles, airplanes, trains, construction and military vehicles, and the like. The window shading system may be used with various objects having at least some transparency, such as goggles, sunglasses, and the like. The window shading system may be used with various types of materials, such as glass, plastic, and the like.

In some embodiments, the processor of the window shading system monitors and records the window shading settings chosen by the user. Examples of window shading settings include, visibility level, indoor brightness, percentage of window coverage, angle of blind slats, tint level, and the like. In some embodiments, the processor monitors and records environmental conditions, particularly when window shading settings are chosen. Examples of environmental conditions include, temperature, time of day, indoor brightness, outdoor brightness, UV strength, user activity (e.g., watching television, reading, sleeping, etc.), and other environmental information. In some embodiments, the user chooses different window shading settings for different environmental conditions using, for example, a remote control, an application of a communication device wirelessly paired with the window shading system, or a user interface of the window shading system. Examples of a communication device include a mobile device, a tablet, a laptop, a desktop computer, and the like. In some embodiments, the processor learns window shading preferences of the user for different environmental conditions.

In some embodiments, the processor executes a learning mode, wherein the processor learns window shading preferences of the user for a predetermined amount of time based on window shading settings chosen by the user and environmental conditions observed by the one or more sensors of the window shading system. In some embodiments, the processor executes a learning mode, wherein the processor learns window shading preferences of the user by autonomously choosing window shading settings for different environmental conditions and monitoring feedback received from the user. In some embodiments, feedback from the user is provided using, for example, a remote control, an application of a communication device wirelessly paired with the window shading system, or a user interface of the window shading system. For example, the user provides positive feedback to the system using a mobile application of a mobile device for fully covering the windows and positioning the blind slats at zero degrees when it is dark outside. In another example, the user provides negative feedback to the system for setting the visibility through the windows and brightness in the room to high when the outside temperature is above 30 degrees Celsius and it is daytime. In some embodiments, the window shading system includes an autonomous mode, wherein the processor autonomously adjusts window shading settings based on the learned preferences of the user and the environmental conditions observed. In some embodiments, the user can adjust the window shading settings at any point in time and the window shading system adjusts the learned preferences of the user based on the window shading settings chosen by the user.

In some embodiments, the window shading system uses artificial neural networks (e.g., convolutional neural network) to learn window shading preferences of the user (e.g., visibility level, brightness, percentage of window coverage, angle of blind slats, and tint level) for different environmental conditions (e.g., temperature, time of day, indoor brightness, outdoor brightness, UV strength, and user activity). In some embodiments, the neural network learns a function that relates window shading settings to environmental conditions. In some embodiments, the neural network receives environmental conditions observed by the one or more sensors of the window shading system as input and outputs window shading settings based on the input received. In some embodiments, the function assigns different weights to different environmental conditions. In some embodiments, the window shading system determines a prediction error between preferences predicted by the system and preferences chosen by the user (during learning mode, for example) and backpropagates the error through the neural network to adjust the learned function and subsequently future predictions. In some embodiments, the window shading system remains in learning mode until the prediction error is below a predetermined threshold.

In some embodiments, the processor of the window shading system uses reinforcement learning to learn the window shading settings preferred by the user for different environmental conditions. In some embodiments, the processor assigns a reward for properly predicting window shading settings for different environmental conditions. In some embodiments, the processor uses a Markov Decision Process, wherein the processor assigns a reward to the system for properly predicting window shading settings for different environmental conditions. In some embodiments, the processor uses the Markov Decision Process during learning mode, wherein the predicted window shading settings for different environmental conditions are compared to the actual window shading settings chosen by the user. In some embodiments, the processor attempts to maximize the reward and subsequently find a policy that specifies the best action to take when in a particular state. In some embodiments, different predicted window shading settings are assigned rewards with different magnitudes.

In some embodiments, different window shading settings are applied to different areas of a window. For example, the processor of the window shading system applies a low tint level to a first portion of a window and no tint to a second portion of the window. In another example, the processor applies low visibility to a bottom portion of a bedroom window and high visibility to a top portion of the bedroom window during the morning.

In some embodiments, the processor of the window shading system learns a window shading settings schedule. In some embodiments, the user manually sets a schedule for the window shading system using, for example, a remote control, an application of a communication device paired with the window shading system, or a user interface of the window shading system. For instance, a schedule includes a low tint level in the mornings and a high tint level in the afternoon and evenings. Schedules can include window shading settings for different times.

In some embodiments, the processor adjusts the window shading settings based on environmental conditions observed. In some embodiments, the user manually chooses window shading settings for different environmental conditions using, for example, a remote control, an application of a communication device paired with the window shading system, or a user interface of the window shading system. In other embodiments, the processor learns which window shading settings to use for different environmental conditions, as described above. For example, the processor applies a high tint level (if nanotechnology tinting system is used, for example) or full window coverage (if physical blinds are used, for example) when outdoor temperature observed by the one or more sensors of the system exceeds a predetermined temperature during the daytime, or applies a low tint level or no window coverage when it is raining. In another example, the processor applies low visibility and high tint level to back windows of a vehicle when passengers are observed in the rear of the vehicle during daytime or to windows of a living room when the television is turned on. In a further example, the processor adjusts the window shading system to a particular indoor brightness level based on the strength of the ultraviolet rays observed by the one or more sensors of the system.

In some embodiments, the window shading system learns different window shading settings for multiple users, as described above. In some embodiments, a user identifies itself to the window shading system using, for example, a remote control, an application of a communication device paired with the window shading system, or a user interface of the window shading system. In some embodiments, the processor predicts the user using the window shading system based on the time of day and window shading settings chosen, or based on sensor data or other data capable of identifying a particular user. In some embodiments, the window shading system loads the window shading preferences of a user upon identifying them.

In some embodiments, the processor of the window shading system monitors the power consumed (e.g., for different tint levels) and attempts to conserve power where possible. In some embodiments, the window shading system automatically deactivates or reduces energy used (e.g., by reducing tint level) to conserve energy. For example, a window shading system of a vehicle deactivates upon sensing the vehicle being located within a parking garage. In another example, the tint level of a window automatically adjusts based on the outdoor brightness. In some embodiments, power saving mode can be deactivated.

In some embodiments, an application of a communication device paired with the window shading system is used to choose window shading settings of one or more window shading systems. In some embodiments, the application of the communication device is paired with one or more window shading systems within one or more establishments.

FIG. 1 illustrates a flowchart describing a method for controlling window shading settings including steps 100, 101, 102, 103, 104, 105, 106, 107, and 108, according to some embodiments.

Figure 2:
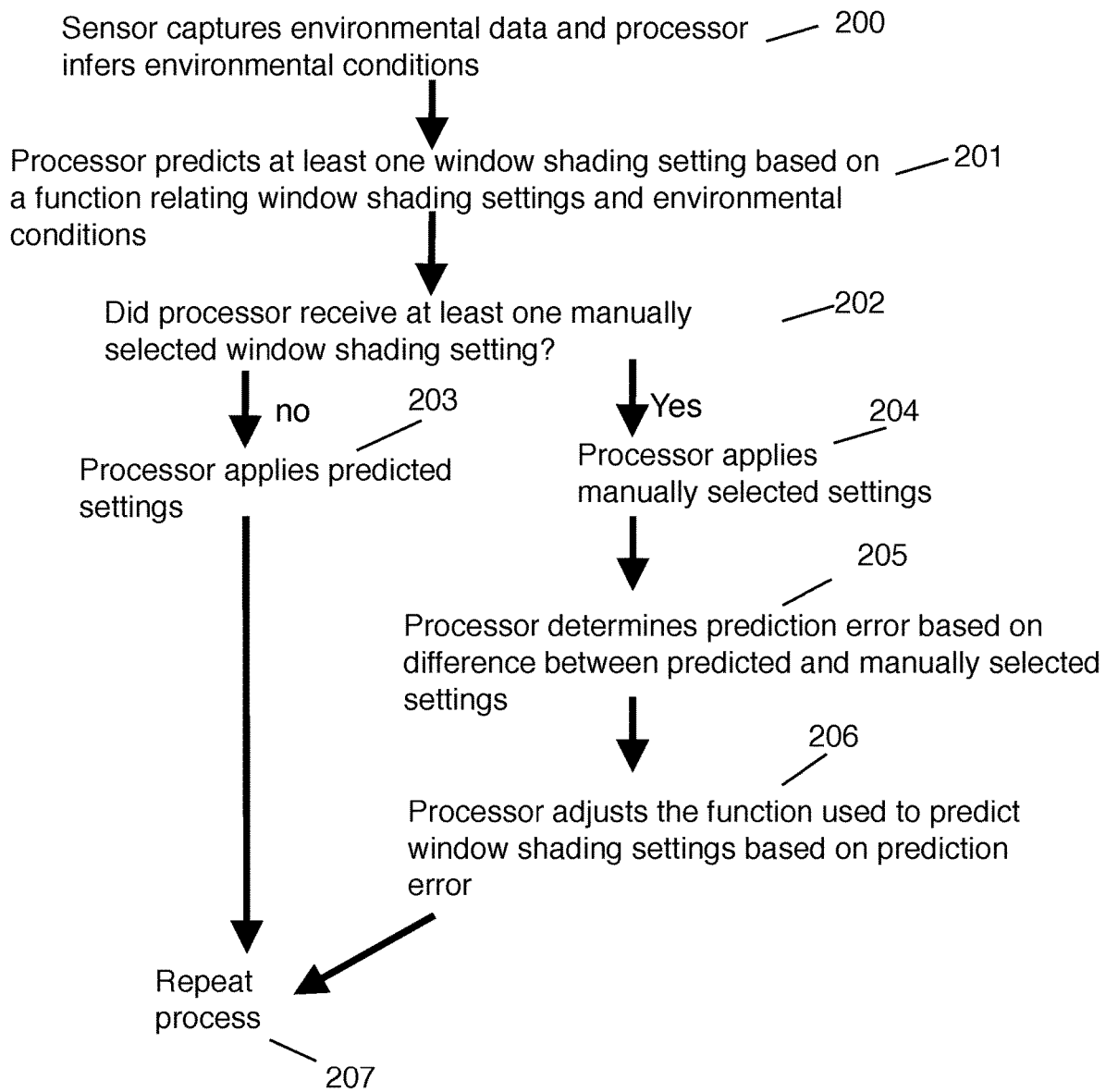
FIG. 2 illustrates a flowchart describing a method for controlling window shading settings, according to some embodiments.

FIG. 2 illustrates a flowchart describing a method for controlling window shading settings including steps 200, 201, 202, 203, 204, 205, 206, and 207, according to some embodiments.

In some embodiments, the technologies described herein may be used for other types of applications. For example, the technologies may be applied to augmented reality or used for interactive displays. A system may learn user preferences, such as a particular display color or image.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A method for adjusting window shade settings of a window shade, comprising:

capturing, with at least one sensor, environmental data of surroundings; and actuating, with a processor, at least one window shading setting to be applied to the window shade based on at least one of the environmental data, window shade setting preferences of a user, and at least one input received by an application of a communication device paired with the processor.

2. The method of claim 1, wherein:
the at least one input designates a window shading setting; and
the processor actuates the window shade setting to be applied.

3. The method of claim 1, wherein:
the at least one input designates the schedule;
the schedule comprises at least one window shade setting to apply during at least one of a particular day and a time; and
the processor actuates the at least one window shade setting to be applied according to the schedule.

4. The method of claim 1, further comprising:
determining, with the processor, at least one window shading setting based on at least the environmental data.

5. The method of claim 4, wherein the processor determines the at least one window shade setting using a learned function of an artificial neural network that relates the environmental data to the at least one window shading setting.

6. The method of claim 1, further comprising:
learning, with the processor, the window shade setting preferences of the user for each environmental condition.

7. The method of claim 6, wherein the processor learns the window shading setting preferences of the user based on historical window shading settings chosen by the user during each environmental condition.

8. The method of claim 6, wherein the processor learns the window shading setting preferences of the user over a predetermined amount of time.

9. The method of claim 6, wherein the processor autonomously actuates adjustments to the window shading settings based on the learned window shading setting preferences of the user and the environmental conditions observed.

10. The method of claim 6, wherein the processor uses artificial neural networks to learn the window shading setting preferences of the user for each environmental conditions.

11. The method of claim 1, further comprising:
learning, with the processor, the schedule, wherein:
the schedule comprises at least one window shade setting to apply during at least one of a particular day and a time; and
the processor actuates the at least one window shade setting to be applied according to the learned schedule.

12. The method of claim 1, further comprising:
learning, with the processor, window shading setting preferences of two or more users for each environmental condition;
identifying, with the processor, a particular user of the two or more users based on sensor data; and
actuating, with the processor, the window shading setting preferences corresponding with the particular user to be applied for a current environmental condition.

13. The method of claim 1, wherein the environmental data comprises at least one of indoor temperature, outdoor temperature, time of day, indoor brightness, outdoor brightness, UV strength, and user activity.

14. The method of claim 1, wherein the at least one window shading setting comprises at least one of: window visibility level, percentage of window coverage, angle of blind slats, and tint level.

15. The method of claim 1, wherein the at least one window shading setting is applied to at least one window comprising at least one of blinds and nanoparticle window films for shading.

16. The method of claim 1, wherein window shading settings are manually applied using at least one of a remote control, an application of a communication device paired with the processor, and a user interface within the surroundings.

17. A tangible, non-transitory, machine readable medium storing instructions that when executed by a processor effectuates operations comprising:
   capturing, with at least one sensor, environmental data of surroundings; and
   actuating, with the processor, at least one window shading setting to be applied to the window shade based on at least one of the environmental data, window shade setting preferences of a user, and at least one input received by an application of a communication device paired with the processor.

18. A window shading system, comprising:
   at least one sensor;
   a processor; and
   a tangible, non-transitory, machine readable medium storing instructions that when executed by the processor effectuates operations comprising:
      capturing, with at least one sensor, environmental data of surroundings; and
      actuating, with the processor, at least one window shading setting to be applied to the window shade based on at least one of the environmental data, window shade setting preferences of a user, and at least one input received by an application of a communication device paired with the processor.

19. The window shading system of claim 18, wherein:
   the at least one input designates the schedule or the processor learns the schedule;
   the schedule comprises at least one window shade setting to apply during at least one of a particular day and a time; and
   the processor actuates the at least one window shade setting to be applied according to the schedule received by the application or the learned schedule.

20. The window shading system of claim 18, further comprising:
   learning, with the processor, the window shade setting preferences of the user, wherein the processor learns the window shading setting preferences of the user based on historical window shading settings chosen by the user.

* * * * *